April 16, 1963 A. C. PETERSON 3,085,771
YIELDABLE SUPPORT MEANS FOR LAND AND AIR VEHICLES
Filed March 14, 1960 4 Sheets-Sheet 1
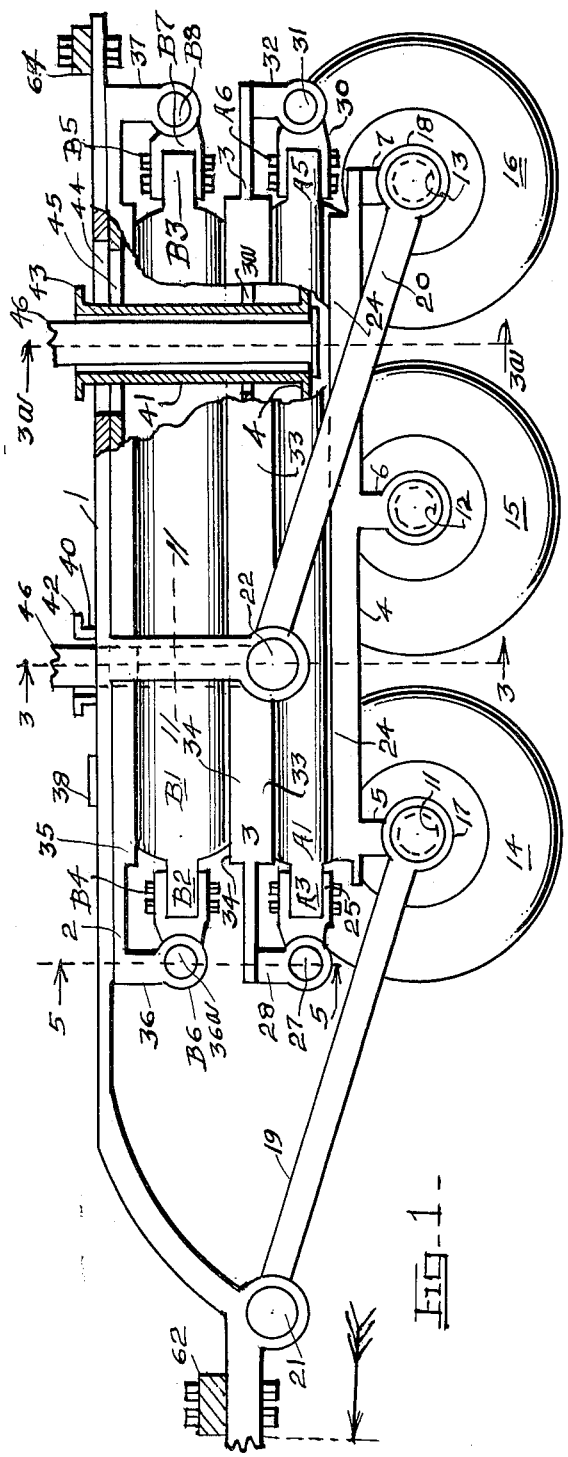
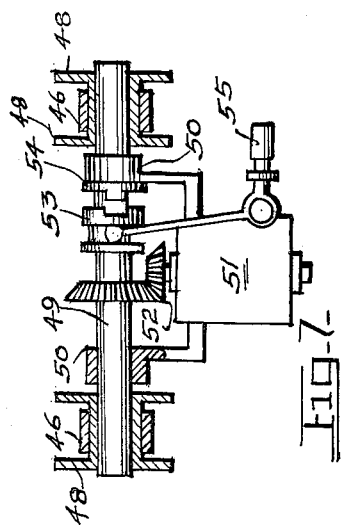
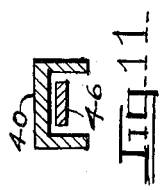
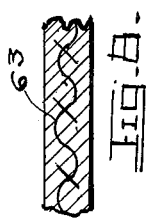
INVENTOR.
Adolph C. Peterson April 16, 1963   A. C. PETERSON   3,085,771
YIELDABLE SUPPORT MEANS FOR LAND AND AIR VEHICLES
Filed March 14, 1960   4 Sheets-Sheet 2

INVENTOR.
Adolphe Peterson.

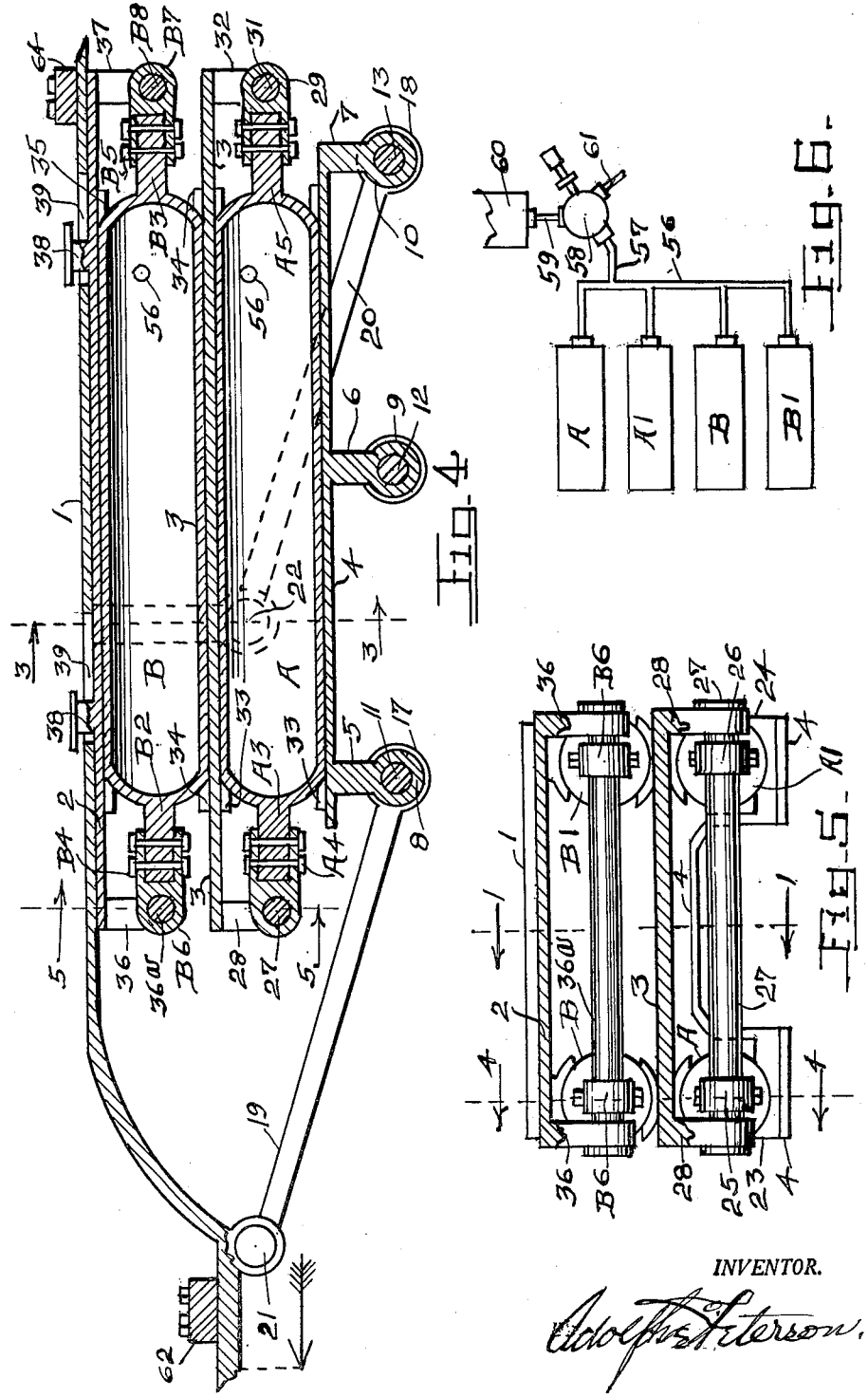

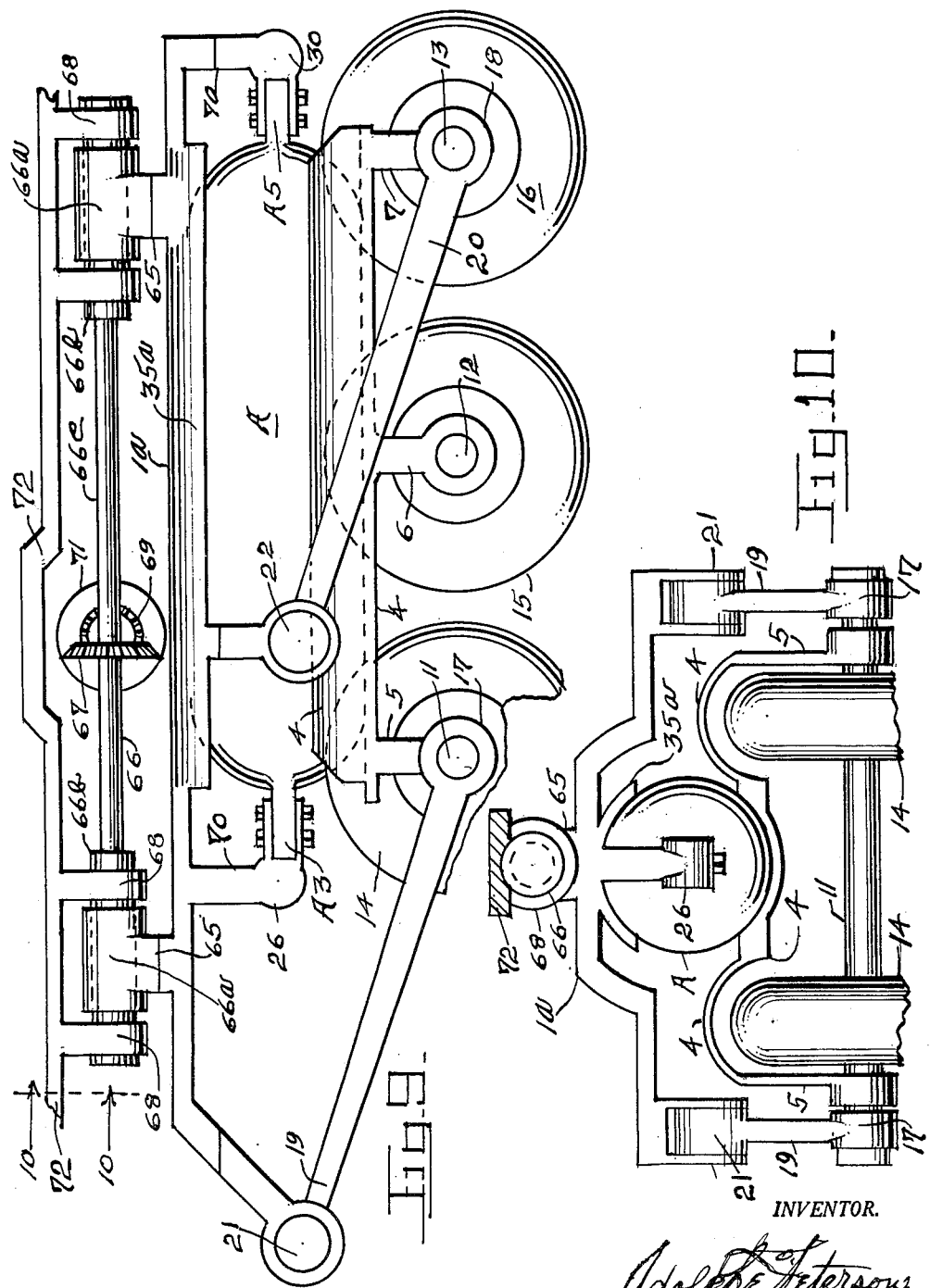

United States Patent Office 3,085,771
Patented Apr. 16, 1963

3,085,771
YIELDABLE SUPPORT MEANS FOR LAND AND AIR VEHICLES
Adolphe C. Peterson, 4623 Bruce Ave. S., Minneapolis, Minn.
Filed Mar. 14, 1960, Ser. No. 14,996
11 Claims. (Cl. 244—104)

My invention relates to yieldable support means for vehicles for land and air transport and especially to landing gear, and it is called—Yieldable Support Means for Land and Air Vehicles.

The chief objects of my invention are to provide a means for yieldable support for vehicles such as airplanes, busses, trucks, and railroad cars, which such means shall be more simple in construction than such means as are generally used for such purposes; which shall because of its simplicity of construction be less costly in production and maintenance; which shall because of a novel feature of its construction be lighter in weight than such means as ordinarily used. A further object of the invention is to provide such means in a form which shall be better adapted to absorb shock either in landing of an airplane or travel of a vehicle on rough ground or highway, and which shall be so adapted to absorb shock without great danger to such means. An important object is to provide such means in a form which shall be more reliable and durable in operation and use, so that its use will, to a greater extent, avoid danger, by such mal-functioning to lives of persons traveling in the vehicle, land or air. The objects stated are sought to be obtained in this means by a new and novel landing or wheel gear which can support large weight because of its multiple wheel construction and because of the yieldable means which is used in the construction to support the vehicle body or fuselage weight and other weight upon the wheel gear support means and the wheels. In general the object of the invention is improved performance in use of such means for vehicles, reduced cost in manufacture, reduced maintenance and cost thereof, and lighter weight of such means in relation to performance.

The principal devices and combinaltions of devices comprising my invention are as hereinafter described and as defined in the claims.

In the accompanying drawings which illustrate my invention, like characters refer to like parts, in so far as practicable, in the first and modified form as shown. Referring to the drawings:

FIGURE 1 is a view chiefly in side elevation of one form of my device, some parts being shown in section on the lines 1—1 of FIGURES 2, 3, and 5, a part of the frame of any vehicle, airplane or land vehicle, being shown only by a detail part of the vehicle frame structure.

FIGURE 4 is a vertical longitudinal section on the lines 4—4 of FIGURES 2, 3, 5, that is it is a vertical section longitudinally through the yieldable support tubes or bottles which are in FIGURES 2 and 3 leftwardly of the longitudinal center vertical plane of the device, so that the road wheels are not here shown.

FIGURE 5 is a transverse vertical section on the lines 5—5 of FIGURES 1 and 4, the front ends of the air tubes or bottles being shown in the background, some parts in frontal view.

FIGURE 6 is a diagrammatic view to show operation of air supply means and valve control therefor, to inflate or deflate air tubes.

FIGURE 7 is a detail section on the line 7—7 of FIGURE 3 to show the motor means for lifting the lower wheel frame.

FIGURE 8 is a section through a short part of the wall structure of the air tubes or bottles.

FIGURES 9 and 10 are views of a modified form, FIGURE 9 being a vertical longitudinal side elevation, FIGURE 10 a front elevation and, in part, a section on line 10—10 of FIGURE 9.

FIGURE 11 is a detail section on line 11—11, FIGURES 1 and 3.

Figure 3:
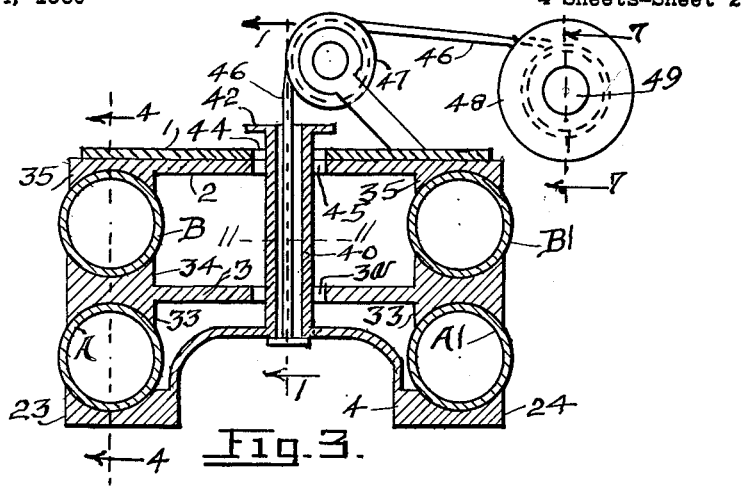
FIGURE 3 is a transverse vertical section on the lines 3—3 of FIGURES 1 and 4, this view including the motor operating means and pulley means for the collapsing or lower wheel frame lifting, for flight of an airplane, but not including road wheels.
Figure 2:
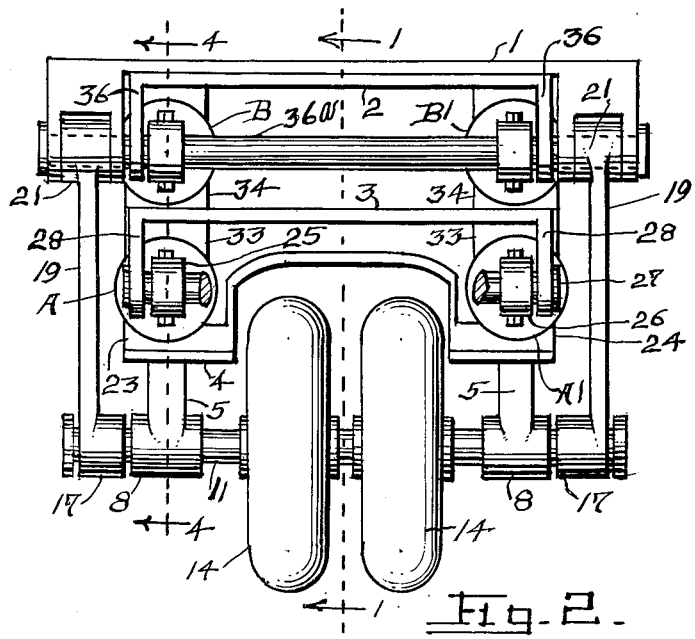
FIGURE 2 is a frontal view of the structure of the device, without however showing the detail parts of the vehicle structure or frame to which or on which the device is mounted, nor the collapsing means.

Referring first to the FIGURES 1 to 8 both inclusive, it will be seen in FIGURES 1, 2, 3, 4 and 5 that there are four horizontal and substantially parallel frames placed in tiered relation vertically, that these frames are numbered individually in their relation vertically from top to bottom, as: 1 a main or base frame, a frame immediately below frame 1 and designated 2 which frame is in slidable contact by its upper surface with the lower surface of frame 1, an intermediate frame designated 3 which is a frame intermediately of an upper pair of air containers or air bottles and a lower pair of air containers or bottles, and a lowermost frame which is designated 4 and is a frame which is immediately below the lower pair of air containers or bottles and has means attached firmly with it to rotatively support and be mounted on three sets of road wheels, that is three pairs of road wheels.

The frame 4 is mounted by means of brackets 5, 6, 7, and their bearings 8, 9, 10, on three wheel axles 11, 12, 13, each of which has rotatively mounted thereon a pair of road wheels 14, 15, 16, each last designated numerals designating the two wheels of one pair of wheels. There are therefore six of such road wheels in all. The road wheels may rotate on the wheel axles 11, 12, 13. The wheel axles 11, 12, 13, bear the road wheels so that each pair is placed close together, intermediately of the associated pair of brackets 5, or 6, or 7, and two wheel axles at the extreme ends bear outwardly of the brackets 5 or 7, into the bearings 17 which are on the ends of wheel axle 11, and the bearings 18 which are on the ends of the wheel axle 13. The wheel axle 12 has no bearings such as bearings 17 and 18. The bearings 17 are respectively on each of two front or leading connecting rods 19 and the bearings 18, respectively, are on the ends of two rearward or trailing connecting rods 20, all of such bearings 17 and 18 being on the lower ends of the connecting rods mentioned.

The connecting rods 19 have at their upper ends bearing means 21 one element of which is attached to the connecting rod and one element of which is attached to the adjacent end, the front end, of the frame 1, the top frame. The connecting rods 20 have at their upper ends, bearing means 22, one of such means at the upper end of each connecting rod 20, one element of each bearing means 22 being attached to its associated connecting rod 20 and the other element of the bearing means 22 being attached to the rearward end of the top frame 1. The two pairs of connecting rods, the front pair 19 and the rearward and trailing pair 20, thus carry and position the lower frame 4 by means of the wheel axles 11, 13, but in such manner that the frame 4 is retained relatively parallel to the top frame 1 but is permitted to move relatively upwardly or downwardly as to top frame 1 and with a relatively slight front and rearward movement relatively to top frame 1, since the connecting rods 19 and 20 are relatively long and their lower ends swing in a relatively long radius arc.

The lower frame 4, the wheel bearing frame, has formed with it two trough-like long horizontal container retainers 23 and 24 respectively, which retainers are relatively parallel at all times and are placed one at each side of the three pairs of road wheels and close thereto. Two air containers designated generally as A and A1 are mounted on retainers 23 and 24 each so that its lower side wall rests in the long trough-like form of the retainer. The front ends of these air containers have integrally formed straps each designated A3 and these straps A3 are fixed in and secured by bolts A4 in strap fixtures 25 and 26 which are oscillatively mounted on the fixture rod 27 the latter being in turn mounted in and secured at its ends in fixture brackets 28 which are secured on the front end of the intermediate frame 3. The rearward ends of the air containers A and A1 have straps A5 formed integrally therewith and these straps are fixed in and secured in strap fixtures 29 and 30 which are oscillatively mounted on the fixture rod 31, the latter being in turn mounted in and secured at its ends in fixture brackets 32 which are secured on the rear end of the intermediate frame 3. Bolts A6 secure the rearward straps.

The intermediate frame 3 has on its lower side two parallel trough-like retainers 33 which are long longitudinally and rest on the top sides respectively of the air containers A and A1. The intermediate frame 3 on its upper side has formed integrally therewith two long trough-like retainers, each designated 34. The frame 2 has trough-like retainers 35 formed integrally therewith, each of which rests on the upper side of one of the two top air containers B and B1, these two air containers being formed similarly to air containers A and A1, each having straps B2 formed integrally therewith at the forward end, each having straps B3 formed integrally therewith at their rearward ends.

Straps B2 are secured by bolts B4 in the strap fixtures B6 which are fixed or mounted on fixture rod 36a which is fixed in brackets 36, the latter being fixed at the forward end of frame 2. Straps B3 are secured by bolts B5 in strap fixtures B7 the latter being fixed or mounted on fixture rod B8. The fixture rod B8 is fixed in fixture brackets 37, the latter being fixed on the rearward end of frame 2. Each of the air containers A and A1 lies between a pair of retainers as has been described, and each of the air containers B and B1 lies between the pair of retainers which are associated with it and as has been described.

The frame 2 has two upwardly extending elements 38 which each have flanges extending horizontally above frame 1 to hold the frame 2 against too far downward movement relative to frame 1 and they are limited in their forward and backward movement relative to frame 1 so that they may not be far displaced, but may have movement in limited length in slots 39.

The lower, wheel mounting frame 4 has firmly secured to its top portion and extending upwardly therefrom vertically, a pair of stabilizing columns 40 and 41 each of which is formed with three sides and a channel therebetween, and each has at its upward end a flange 42 and 43, respectively which extends horizontally over the upper frame 1, and each has a short sliding movement permitted to it by slots 44 and 45, respectively, formed in frames 1 and 2. Each of these stabilizing columns has placed in it a belt type or other lifting member 46 which is so flexible that it may bend over a pulley 47 which is associated with it and fixed on the upper side of frame 1, and which belt may be wound upon (or unwound from) a second larger pulley 48, the latter being fixed upon a gear shaft 49. The shaft 49 is rotatable in bearing brackets 50 and driven in either direction by an electric motor 51 through reduction gears 52. At an end of the gear shaft there is a clutch member 53 which may be engaged by a stationary (nonrotatable) clutch member 54 which is clutched or unclutched by a hand lever 55 or any other means, to hold the gear shaft against rotation when the wheel frame 4 has been relatively upwardly lifted. There are slots 3a in 3.

Referring to FIGURE 6, there is illustrated diagrammatically the four air containers A, A1, B, B1, and piping 56 which connects all these four air containers by one pipe 57 and hand valve unit 58, and pipe 59 to air supply means 60, the latter being any air supply under pressure, such as an air reservoir or an air pump means of any type, the unit supplying air under a pressure which may be twenty to thirty pounds or even as much more as the air containers and means are designed to withstand. This pressure will in any construction be that which is deemed to be suitable and necessary for the particular construction and its use. The hand valve unit 58 may in one placement or condition permit air to flow to the air containers and may in an alternate condition permit air from the air containers to flow through a release pipe 61, to thereby permit the air containers to deflate and be collapsed for retraction of the wheel frame 4 upwardly. The latter movement when executed by the pilot of an airplane moves frames 4 and 3 upwardly to collapse or relatively flatten the air containers A, A1, B, B1, so that thereby the frame assembly with its air containers is lifted upwardly by current concurrently supplied to the electric motor lifting means and the depth of the device from frame 1 to the lower sides of the road wheels is much lessened. This retraction means is in substitution for such means as found in airplanes, and any other form may be substituted, and in use for busses and trucks the lifting and collapsing means may be omitted as it would in such use not be necessary or desirable.

All of the air containers are formed with walls of rubber or other flexible material such as any suitable plastic or even any suitable metal or other fibre. The containers may themselves be not permeable by air under pressure or they may as usual in pneumatic tires be formed with a flexible liner to contain air under pressure. The walls of rubber or plastic may have any fabric or cord tension resisting means as is customarily used in pneumatic tires. Such tension resisting means, as fabric or cord is shown in FIGURE 8 where the tension resisting means is designated as 63. The tension resisting material may extend into the straps of the containers. In mounting of the air containers by the straps there is sufficient tension longitudinally of the containers so that they are thereby held in place in the retainer means or trough-like structures, but that tension is not such as will prevent the necessary collapsing movement of the air containers.

In use of the device, the air containers normally function as a yieldable or spring means, and the frames 3 and 2 will have some movement with the containers longitudinally but only to the limited extent which may be necessary so that the air containers are maintained substantially in the same vertically tiered relation. It may be noted, however, that in a case where the air containers are relatively large and the connecting rods described are relatively long, the means to permit some movement of frame 2 under frame 1 may be omitted, and in that case the frames 1 and 2 may be made as one, that is united to form one frame, this in other words would mean that the brackets depending from frame 2 to receive the straps at ends of the containers B and B1 may be attached directly to frame 1 in some constructions.

In use the device which has been described as including frames 1, 2, 3, 4, may be attached to a vehicle structure, as an airplane, aircraft, bus or truck or railroad car, as is shown in FIGURE 1 and in FIGURE 4, structural members of a fuselage frame or wing structure or a bus or railroad car or truck, being merely indicated by the vehicle frame members, shown in transverse section, and designated in FIGURES 1 and 4 by the numerals 62 and 64, respectively. It is contemplated that the device described may be used in a multiple number in any vehicle unit, and that in aircraft especially the device may be applied thereto in any such manner as wheel means are usually incorporated with aircraft to be retractable and that it may be incorporated with wing structures or fuselage structures. In use for busses, trucks, and railroad cars, the road wheel pairs, that is pairs on wheel axles 11, 12, 13, may have the two wheels of each pair separated transversely of the vehicle as much as may be necessary in any particular construction and that may be as shown or with the road wheels and air containers reversed in their relative positions transversely of the vehicle, that is road wheels may be laterally outwardly of the air containers rather than between them as shown.

The support of the wheel frame 4 may be otherwise in relation to the vehicle structure, that is some other mounting of the frame 4 to the vehicle structure may be used, the yieldable support means being relatively similar. I have shown two tiers of air containers, two containers in each tier, but the air containers may be used in any number, at least one being used, and preferably several as shown or in any number.

In use, when a vehicle using the device strikes an elevation in the road bed traveled over, or when an aircraft using the device lands on a landing field, the road wheels in receiving a shock at such time rise upwardly, the connecting rods swinging on their pivots attached to frame 1 and the upward rise carries the road wheels slightly backwardly, relatively to frame 1, and compresses the air containers between frames 4 and 3, and also if rise is continued compresses the air containers between frames 3 and 2, their side walls flexing for that movement, and the air containers are thusly collapsed vertically to absorb shock. Frames may be placed and proportioned to absorb by compression of the containers as much as is deemed necessary. The road wheels are held relatively stable in their vertical alignment but this stability is assisted in the construction shown by the vertical columns attached to frame 4, these columns serving to hold frames 3 and 2 in relative alignment with frame 4, but such columns may be omitted.

In an aircraft, for retraction of the frames and road wheels, the pilot may turn the hand valve to release air from air containers A, A1, B, B1, and shut off air entry thereto, so that then the pilot may cause electric motors of the belt means to lift the wheel frame 4, and thereby compress the air containers to a relatively collapsed and thin depth, thereby lessening the wind resistance. Any enclosure means may if desired be added. To prepare for landing the pilot releases the clutch 53—54 and turns hand valve 58 to deliver air under pressure to the air containers, whereupon the frames separate, to positions shown in drawings, and the device is then prepared for the landing shock.

Since there will be or may be some movement relatively of the frames 1 and 2, some lubrication substance such as graphite or oil may be placed between the frames 1 and 2 to permit ease of such movement, as such movement is limited however. In lieu of such lubrication any non-friction means such as roller bearings may be placed between frames 1 and 2.

In FIGURE 1 a large arrow is shown at the left of the figure, this arrow pointing to the leftward of the figure, and this arrow indicates the direction of flight of an aircraft employing the device, or any vehicle employing the device, to be leftwardly of FIGURE 1, that is in such flight or movement, the pivots by which the connecting rods securing the road wheels are mounted to the frame 1, lead in the movement of the vehicle employing the device, so that the road wheels trail from those pivots.

Referring now to the figures designated 9 and 10, these views show a modified form of my device, which modified form is a form which may be applied to lighter weight vehicles, such as aircraft, trucks, busses, railroad cars, and this form utilizes only one shock absorbing air container, denoted A, and the road wheels of each pair of road wheels, are mounted on their axles so that one is slightly away outwardly of the air container A and the other is slightly away on the other side of the air container A, that is the longitudinal axis of the air container A is centrally of the transverse width of the device, and the road wheels are removed sidewisely from the air container, three road wheels trailing in one line on one side of the air container A and three road wheels trailing on the other side of the air container A. There is no intermediate frame in this form, the frame designated 1a being the only frame above the road wheel mounting frame 4, and the retainer trough-like structure 35a is fixed to frame 1a and rests on the upper side of the single air container A.

This form has another important difference, which is that the top frame 1a is not rigidly fixed and secured on the vehicle structural members 62—64, but is instead mounted by a pair of bracket fixtures 65 securely on an oscillative axle or pivot-unit 66 which is oscillative as one unit but has the individual elements 66a, 66b, 66c, so that, when a large bevel gear 67 is turned, the unit 66 will turn as a unit with bevel gear 67 and thereby oscillatively swing the frame 1a and all its associated members including road wheels, connecting rods 19, 20 and air container A and its mounting means with it, as one unit. In this manner the road wheel mounting means and its yieldable means may be swung upwardly on the axis of unit 66, in the bearing members 68, for retraction of the device and enclosure of the device within an aircraft structure, for normal flight of the aircraft, without drag of the landing road wheels.

The bevel gear 67 is in permanent engagement with a smaller bevel gear 69 which is fixed on the armature shaft of an electric motor shaft 71 so that this may be used to drive the bevel gears 67—69 in opposite directions for either the retraction movement or the movement to the landing wheel position. Since there is only one air container A shown in this form, this is extended, as in the other form but is mounted on the single bracket fixtures 70, one at each end, the bracket fixture, securing the air container as in the first form illustrated but being directly on the frame 1a. No separate trough-mounting means, as in the first form, is used, but instead the trough rests directly on air container A and is supported by frame 1a, directly. The connecting rods are shown as longer in proportion, so that there is a lesser relative longitudinal movement between frames 4 and 1a. Therefore, the air container A, being also relatively larger in diameter, will yield more between the frames 1a and 4, to permit the relative movement as necessary. And it is contemplated that in this form, which is intended particularly for the smaller type of aircraft, some lubricating substance such as graphite or other lubricating substance may be placed between the side walls of the air container A and the side walls of the frames 1a and 4 which contact the side wall of the air container, to thereby permit some movement of the air container relatively to the means between which it rests.

The air container and road wheels have a relative placement, transversely as in FIGURE 10, but this relative placement may not necessarily be used, since they may be relatively placed otherwise as for instance in one plane vertically and longitudinally. Thus the relative transverse width may be lessened, for easier enclosure within an aircraft structure upon retraction, for normal flight. A structural member 72 of the aircraft has the bearing members 68 securely fixed thereon or formed therewith.

A section on the line 3a—3a of FIGURE 1 would show substantially the same means as that on line 3—3 of FIGURE 1, that on line 3a—3a being a section of duplicate members, and therefore such section is not specifically illustrated.

I have described the air containers by the word "air" and as using "air," but it is contemplated that air is a gaseous fluid and that any gaseous fluid which is suitable may be used in place of atmospheric air. While my device has been illustrated by use of certain forms and combinations of devices, it is contemplated that other detailed devices and combinations of devices may be used in the realization of my invention without departing from the intention and contemplation thereof.

What I claim is:

1. Wheel support means of the character described comprising: a wheel frame and bearing means mounted thereon to rotatably mount in relative trailing location at least two wheels, the said wheel frame having a length at least equivalent to the distance between axles of the wheels most remote from each other; an upper frame and means by which said upper frame is secured to structural frame members of a vehicle for transportation and retained in substantial horizontal position, the upper frame having a length substantially equivalent to that of the wheel frame; a connecting means between the upper frame and the wheel frame and by which said frames are maintained in substantial parallel positions and by which the wheel frame is permitted a movement upwardly and downwardly relatively to the upper frame; a flexible walled fluid container having a length substantially equivalent to that of said frames to contain gaseous fluid under pressure and means retaining said fluid container between said frames and normally longitudinally parallel thereto to be compressible between the upper frame and the wheel frame; the said means retaining said container between said frames being further defined as comprising a horizontal longitudinal extension of the wall of said container at one end which is secured at that end to an adjacent end of one of said frames and a horizontal longitudinal extension of the wall of said container at the opposite end and which is at that end secured to an adjacent end of one of said frames; the said connecting means being further defined as comprising a connecting rod means pivotably secured at one end by a horizontal laterally stabilizing pivot means to said upper frame substantially at one end thereof and pivotably secured at its opposite end by a horizontal laterally stabilizing pivot means to the adjacent end of the wheel frame, and comprising another connecting rod means pivotably secured at one end by a horizontal laterally stabilizing pivot means to the upper frame at a location remote from the similar connection of the first named connecting rod means and being pivotably secured at its opposite end by a horizontal laterally stabilizing pivot means to said wheel frame at a location remote from the connection of said first named connecting rod means to said wheel frame; the said connecting rod means at each end of said wheel frame having a pivoting axis coincidental with the pivoting axis of said wheel frame and coincidental with the rotation axis of the wheel at a like end.

2. The device as defined in claim 1, and: the means by which the upper frame is secured to structural members of a vehicle including a pivot means serving as the securing means between the structural frame members and the said upper frame and means whereby the device including said upper frame is swung oscillatively on the last named pivot means to place the device in a position for shock absorption as on landing, and is swung alternatively to a position such that said device including said upper frame is placed in a position such that it is substantially at right angles to the position for shock absorption.

3. The device as defined in claim 1, and: a means to supply fluid under pressure and a valve means by which the fluid under pressure may be permitted to flow to said container to expand it under pressure and may alternatively be disconnected from the container and whereby in said alternative condition fluid under pressure may be released from the container, and means whereby when fluid is released the said wheel frame may be relatively moved to compress the container to flatten it and reduce the vertical distance between said wheel frame and said upper frame.

4. Wheel support means of the character described comprising: a wheel frame and bearing means mounted thereon to rotatably mount in relative trailing location at least two wheels, the said wheel frame having a length at least equivalent to the distance between axles of two wheels most remote from each other; an upper frame and means by which said upper frame is secured to structural frame members of a vehicle for transportation and retained in substantial horizontal position, the upper frame having a length substantially equivalent to that of the wheel frame; a connecting means between the upper frame and the wheel frame and by which said frames are maintained in substantial parallel positions and by which the wheel frame is permitted a movement upwardly and downwardly relatively to the upper frame; a flexible walled fluid container having a length substantially equivalent to that of said frames to maintain gaseous fluid under pressure and means retaining said fluid container between said frames and longitudinally parallel thereto to be compressible between the upper frame and the wheel frame; the said means retaining said gaseous fluid container between said frames being further defined as comprising an horizontally longitudinal extension of the wall of said container at one end and which is secured at that end to an adjacent end of each of said frames and a horizontal longitudinal extension of the wall of said container at the opposite end and which is at that end secured to an adjacent end of one of said frames; the said connecting means being more particularly defined as, a pair of connecting rods at one end of said frames and a pair of connecting rods remote therefrom and at the other end of said frames, each pair of connecting rods being pivotably secured at their opposite ends to said upper frame at one end and to said wheel frame at the other end, each of said connecting rods having at one end a horizontal laterally stabilizing pivoting axis by which it is connected to the upper frame, and having at its opposite end a horizontal laterally stabilizing pivoting axis coincidental with the pivoting axis of said wheel frame and coincidental with the rotation axis of the wheel at the like end and by which it is connected to the wheel frame.

5. The device as defined in claim 4 and: a means to supply fluid under pressure and a valve means by which the fluid under pressure may be permitted to flow to said container to expand it under pressure and may simultaneously be disconnected from the container and whereby in said alternative condition fluid under pressure may be released from the container, and means whereby when fluid is released the said wheel frame may be relatively moved to compress the container to flatten it and reduce the vertical distance between said wheel frame and said upper frame.

6. Wheel support means of the character described comprising: a wheel frame and bearing means mounted thereby to rotatably mount in relative trailing positions at least two wheel means, the said wheel frame having a length at least equivalent to the distance between axes of the wheel means most remote from each other; an upper frame and means by which said upper frame is secured to structural frame members of a vehicle for transportation and retained in substantial horizontal position, the upper frame having a length substantially equivalent to that of the wheel frame; a connecting means between the upper frame and the wheel frame and by which said frames are maintained in substantial parallel positions and by which the wheel frame is permitted a movement upwardly and downwardly relatively to the upper frame; a resilient cushioning means disposed between said upper frame and said wheel frame to be longitudinally therebetween and means retaining such means in location; the said connecting means being further defined as comprising a connecting rod means pivotably secured at one end by a horizontal laterally stabilizing pivot means to said upper frame substantially at one end thereof and pivotably secured at its opposite end by a horizontal laterally stabilizing pivot means to the adjacent end of the wheel frame, and comprising another connecting rod means pivotably secured at one end by a horizontal laterally stabilizing pivot means to the upper frame at a location remote from the similar connection of the first named connecting rod means and being pivotably secured at its opposite end by a horizontal laterally stabilizing pivot means to said wheel frame at a location remote from the connection of said first named connecting rod means to said wheel frame; the said connecting rod means at each end of said wheel frame having a pivoting axis coincidental with the pivoting axis of said wheel frame and coincidental with the rotation axis of the wheel means at a like end; the said wheel means at each end of said wheel frame having location centrally of said stabilizing pivot means.

7. Wheel support means of the character described comprising: a wheel frame and bearing means mounted thereon to rotatably mount in relative trailing location at least two wheels, the said wheel frame having a length at least equivlent to the distance between axles of the wheels most remote from each other; an upper frame and means by which said upper frame is secured to structural frame members of a vehicle for transportation and retained in substantial horizontal position, the upper frame having a length substantially equivalent to that of the wheel frame; a connecting means between the upper frame and the wheel frame and by which said frames are maintained in substantial parallel position and by which the wheel frame is permitted a movement upwardly and downwardly relatively to the upper frame; a flexible walled fluid container having a length substantially equivalent to that of said frames to contain gaseous fluid under pressure and means retaining said fluid container between said frames and normally longitudinally parallel thereto to be compressible between the upper frame and the wheel frame; the said means retaining said gaseous fluid container between said frames being further defined as comprising a horizontal longitudinal extension of the wall of said container at one end and which is secured at that end to an adjacent end of one of said frames and a horizontal longitudinal extension of the wall of said container at the opposite end and which is at that end secured to an adjacent end of one of said frames; the means by which the upper frame is secured to structural members of a vehicle including a pivot means serving as the securing means between the structural frame members and the said upper frame and means whereby the device including said upper frame is swung oscillatively on the last named pivot means to place the device in a position for shock absorption as on landing, and is swung alternatively to a position such that said device including said upper frame is placed in a position to be substantially at right angles to the position for shock absorption.

8. Wheel support means of the character described comprising: a wheel frame means and bearing means mounted thereon to rotatably mount in relatively trailing location at least two wheels, the said wheel frame means having a length at least equivalent to the distance between axles of the wheels most remote from each other; an upper frame means and means by which said upper frame means is secured to structural frame members of a vehicle for transportation such as an aircraft and retained in substantial horizontal position, the upper frame means having a length substantially equivalent to that of the wheel frame means; a container fixture means secured to said upper frame means at one end thereof and a container fixture means secured to said upper frame means at the other end thereof; a connecting means between the upper frame means and the wheel frame means and by which said frames are maintained in substantial parallel positions and by which the wheel frame means is permitted a movement upwardly and downwardly relatively to the upper frame means; a flexible walled fluid container means having a length substantially equivalent to that of said frames to maintain gaseous fluid under pressure and means retaining said container means between said frames and horizontal and longitudinally parallel thereto to be compressible between the upper frame means and the wheel frame means, said last named means being horizontal longitudinal extensions at each end of the wall of said container means, the said extensions at one end of the container means being secured to said container fixture means at one end of said frames and the extensions at the other end of said container means being secured to said container fixture means at the other end of said frames; the means by which said upper frame means is secured to structural members of a vehicle including a pivot means serving as the securing means between the structural frame members and the said upper frame means whereby the device including said upper frame means is swung oscillatively on the last named pivot means to place the device in a position for shock absorption as on landing, and is swung alternatively to a position such that said device including said upper frame means is placed in a position to be substantially at right angles to the position for shock absorption.

9. Wheel support means of the character described comprising: a wheel frame and bearing means mounted thereon to rotatively mount in relative location at least two wheels, the said wheel frame having a length at least equivalent to the distance between axles of the wheels most remote from each other; an upper frame and means by which said upper frame is secured to structural frame members of a vehicle for transportation and retained in substantial horizontal position, the upper frame having a length substantially equivalent to that of the wheel frame; a connecting means between the upper frame and the wheel frame and by which said frames are maintained in substantial parallel positions and by which the wheel frame is permitted a movement upwardly and downwardly relatively to the upper frame; a pair of flexible walled gaseous fluid containers to contain gaseous fluid under pressure, each having a length substantially equivalent to that of said frames, means retaining said pair of containers between said frames and horizontal and longitudinally parallel thereto and to each other to be compressible between the upper frame and the wheel frame; the said means retaining said gaseous fluid containers between said frames being further defined as comprising horizontal longitudinal extensions of the walls of said gaseous fluid containers at each end of said containers, extensions at one end being secured to an adjacent end of one of said frames and extensions at the other end being secured to an adjacent opposite end of the same one of said frames; the said connecting means being further defined as comprising a connecting rod means at one end of said frames and a connecting rod means remote therefrom and near the other end of said frames, each said connecting rod means being pivotably secured at their opposite ends, at one end to said upper frame and at the opposite end to said wheel frame; each said connecting rod means having at one end a horizontal laterally stabilizing pivoting axis by which it is connected to the upper frame, and having at its opposite end a horizontal laterally stabilizing pivoting axis coincidental with the pivoting axis of said wheel frame and coincidental with the rotation axis of the wheel at the like end and by which it is connected to the wheel frame.

10. Wheel support means of the character described comprising: a wheel frame means and bearing means mounted thereon to rotatably mount in relatively trailing location at least two wheels, the said wheel frame means having a length at least equivalent to the distance between axles of the wheels most remote from each other; an upper frame means and means by which said upper frame means is secured to structural frame members of a vehicle for transportation such as an aircraft and retained in substantial horizontal position, the upper frame means having a length substantially equivalent to that of the wheel frame means; a container fixture means secured to said upper frame means at one end thereof and a container fixture means secured to said upper frame means at the other end thereof; a connecting means between the upper frame means and the wheel frame means and by which said frames are maintained in substantial parallel positions and by which the wheel frame means is permitted a movement upwardly and downwardly relatively to the upper frame means; a flexible walled fluid container means having a length substantially equivalent to that of said frames to maintain gaseous fluid under pressure and means retaining said container means between said frames and horizontal and longitudinally parallel thereto to be compressible between the upper frame means and the wheel frame means, said last named means being horizontal longitudinal extensions at each end of the wall of said container means, the said extensions at one end of the container means being secured to said container fixture means at one end of said frames and the extensions at the other end of said container means being secured to the container fixture means at the other end of said frames; the said connecting means including at each end of said frames a pair of connecting rods, each pair of connecting rods being at one end pivotally anchored to said upper frame means and at the other end to said wheel frame means, one member of each pair of connecting rods being laterally exteriorly of said wheels and on one side of said wheels and one member of each pair of connecting rods being laterally exteriorly of said wheels on the other side thereof; each of said connecting rods having at one end a horizontal laterally stabilizing pivoting axis by which it is connected to the upper frame, and having at its opposite end a horizontal laterally stabilizing pivoting axis coincidental with the pivoting axis of the wheel at the like end and by which it is connected to the wheel frame.

11. Wheel support means of the character described comprising: a wheel frame means and bearing means mounted thereon to rotatably mount in relative trailing location at least two wheels, the said wheel frame means having a length at least equivalent to the distance between axles of the wheels most remote from each other; an upper frame means and means by which said upper frame means is secured to structural frame members of a vehicle for transportation such as an aircraft and retained in substantial horizontal position, the upper frame means having a length substantially equivalent to that of the wheel frame means; a container fixture means secured to said upper frame means at one end thereof and a container fixture means secured to said upper frame means at the other end thereof; a connecting means between the upper frame means and the wheel frame means and by which said frames are maintained in substantial parallel positions and by which the wheel frame means is permitted a movement upwardly and downwardly relatively to the upper frame means; a flexible walled fluid container means having a length substantially equivalent to that of said frames to maintain gaseous fluid under pressure and means retaining said container means between said frames and horizontal and longitudinally parallel thereto to be compressible between the upper frame means and the wheel frame means, said last named means being horizontal longitudinal extensions at each end of the wall of said container means, the said extensions at one end of the container means being secured to said container fixture means at one end of said frames and the extensions at the other end of said container means being secured to the container fixture means at the other end of said frames; the said connecting means being further defined as comprising a connecting rod means at one end of said frames and a connecting rod means remote therefrom and near the other end of said frames, each said connecting rod means being pivotally secured at their opposite ends, at one end to said upper frame and at the opposite end to said wheel frame; each of said connecting rod means having at one end a horizontal laterally stabilizing pivoting axis by which it is connected to the upper frame, and having at its opposite end a horizontal laterally stabilizing pivoting axis coincidental with the pivoting axis of said wheel frame and coincidental with the rotation axis of the wheel at the like end and by which it is connected to the wheel frame.

References Cited in the file of this patent

UNITED STATES PATENTS

| | | |
|---|---|---|
| 1,667,275 | Warhus | Apr. 24, 1928 |
| 1,802,366 | Adamson | Apr. 28, 1931 |
| 2,463,351 | Bowers | Mar. 1, 1949 |
| 2,722,389 | Hardeman et al. | Nov. 1, 1955 |
| 2,742,301 | Pointer | Apr. 17, 1956 |
| 2,891,786 | Norrie | June 23, 1959 |

FOREIGN PATENTS

| | | |
|---|---|---|
| 665,331 | France | May 6, 1929 |
| 604,223 | Great Britain | June 30, 1948 |